(12) United States Patent
Nguyen et al.

(10) Patent No.: US 8,491,993 B2
(45) Date of Patent: Jul. 23, 2013

(54) POLYMERIC DYES, OVERCOAT COMPOSITIONS AND THERMAL LITHOGRAPHIC PRINTING PLATES

(75) Inventors: My T. Nguyen, Kirkland (CA); Marc-Andre Locas, Pierrefonds (CA)

(73) Assignee: American Dye Source, Inc. (CA)

( * ) Notice: Subject to any disclaimer, the term of this patent is extended or adjusted under 35 U.S.C. 154(b) by 429 days.

(21) Appl. No.: 12/669,805

(22) PCT Filed: Jul. 24, 2008

(86) PCT No.: PCT/CA2008/001371
§ 371 (c)(1), (2), (4) Date: Jan. 20, 2010

(87) PCT Pub. No.: WO2009/015467
PCT Pub. Date: Feb. 5, 2009

(65) Prior Publication Data
US 2010/0215944 A1  Aug. 26, 2010

Related U.S. Application Data

(60) Provisional application No. 60/952,963, filed on Jul. 31, 2007.

(51) Int. Cl.
*B23B 5/16* (2006.01)

(52) U.S. Cl.
USPC ........................................ 428/323

(58) Field of Classification Search
USPC ........................................ 428/323
See application file for complete search history.

(56) References Cited

U.S. PATENT DOCUMENTS

| | | |
|---|---|---|
| 4,144,252 A | 3/1979 | Wang et al. |
| 4,228,259 A | 10/1980 | Kalopissis et al. |
| 4,273,851 A * | 6/1981 | Muzyczko et al. ........... 430/175 |
| 5,122,432 A | 6/1992 | Hammann, IV et al. |
| 6,124,425 A | 9/2000 | Nguyen |

(Continued)

FOREIGN PATENT DOCUMENTS

| | | |
|---|---|---|
| FR | 2867970 A1 | 9/2005 |
| JP | 2004086231 | 3/2004 |

(Continued)

OTHER PUBLICATIONS

Norman, Lana L. et al., Solution Properties of Self-Assembled Amphiphilic Copolymers Determined by Isomerization Spectroscopy, J. Phys. Chem. B. 2002, 106, 8499-8503.

Cresswell, JP et al. "Langmuir-Blodgett Deposition and Second-order Non-linear Optics of Several Azobenzene Dye Polymers", Advanced Materials for Optics and Electronics, 6:33-38 (1996).

(Continued)

*Primary Examiner* — Elizabeth A Robinson
(74) *Attorney, Agent, or Firm* — Wilmer Cutler Pickering Hale & Dorr LLP.

(57) ABSTRACT

A thermal lithographic printing plate overcoat composition comprising (a) a water-soluble polymeric dye having an absorption band between about 300 and about 600 nm; and (b) micro-particles or nano-particles is provided. A negative-working thermal lithographic printing plate comprising (a) a hydrophilic substrate; (b) a near infrared imaging layer disposed on the hydrophilic substrate; and (c) an overcoat layer disposed on the imaging layer, said overcoat layer comprising a water-soluble polymeric dye having an absorption band between about 300 and about 600 nm; and micro-particles or nano-particles is also provided. Finally, a water-soluble polymeric dye having an absorption band between about 300 and about 600 nm is provided.

18 Claims, 5 Drawing Sheets

U.S. PATENT DOCUMENTS

| | | | |
|---|---|---|---|
| 6,177,182 B1 | 1/2001 | Nguyen | |
| 6,482,571 B1 | 11/2002 | Teng | |
| 6,534,235 B1 * | 3/2003 | Hanabata et al. | 430/191 |
| 6,541,183 B2 | 4/2003 | Teng | |
| 6,846,614 B2 | 1/2005 | Timpe et al. | |
| 6,899,994 B2 | 5/2005 | Huang et al. | |
| 6,949,327 B2 | 9/2005 | Zheng et al. | |
| 2002/0031715 A1 | 3/2002 | Maemoto et al. | |
| 2003/0091932 A1 * | 5/2003 | Loccufier et al. | 430/272.1 |
| 2009/0214460 A9 | 8/2009 | Luukas | |

FOREIGN PATENT DOCUMENTS

| | | |
|---|---|---|
| JP | 2006150722 | 6/2006 |
| JP | 2007187836 | 7/2007 |
| SU | 619489 | 8/1978 |
| WO | WO 96/34317 | 10/1996 |
| WO | WO-2006024099 A1 | 3/2006 |
| WO | 2006/101211 A1 | 9/2006 |
| WO | 2007/003030 A1 | 1/2007 |
| WO | WO-2007080612 A1 | 7/2007 |

OTHER PUBLICATIONS

Jiang, W et al. "Photo-switched wettability on an electrostatic self-assembly azobenzene monolayer", Chem. Comm., 3550-3552 (2005).

Tanchak, OM et al. "Light-Induced Reversible Volume Changes in Thin Films of Azo Polymers: The Photomechanical Effect", 38: 10566-10570 (2005).

Zucolotto, V et al. "The influence of electrostatic and H-bonding interactions on the optical storage of layer-by-layer films on an azopolymer", 43:4645-4650 (2002).

Supplementary European Search Report, EP 08783284, Aug. 26, 2011.

U.S. Appl. No. 60/823,415, filed Aug. 24, 2006, Nguyen et al.

International Search Report issued in International application No. PCT/CA2008/001371, completed on Oct. 18, 2008, mailed on Oct. 23, 2008.

* cited by examiner

US 8,491,993 B2

POLYMERIC DYES, OVERCOAT COMPOSITIONS AND THERMAL LITHOGRAPHIC PRINTING PLATES

CROSS-REFERENCE TO RELATED APPLICATIONS

This application is a National Entry Application of PCT application no PCT/CA2008/001371 filed on Jul. 24, 2008 and published in English under PCT Article 21(2), which itself claims benefit of U.S. provisional application Ser. No. 60/952,963, filed on Jul. 31, 2007. All documents above are incorporated herein in their entirety by reference.

FIELD OF THE INVENTION

The present invention relates to polymeric dyes, overcoat compositions and to thermal lithographic printing plates. More specifically, the present invention is concerned with polymeric dyes and overcoat compositions containing these dyes for protecting the imaging layer of thermal lithographic printing plates. The present invention is also related to thermal lithographic printing plates comprising these overcoat compositions.

BACKGROUND OF THE INVENTION

Thermal lithographic offset printing plates are known in the prior art. For examples, U.S. Pat. Nos. 6,124,425 and 6,177,182 taught to prepare positive and negative working printing plates comprising a radiation sensitive layer that can be imaged with near infrared laser light and developed with aqueous developers.

U.S. Pat. Nos. 6,994,327 and 6,899,994 taught to prepare negative-working thermal lithographic printing plates comprising a hydrophilic polymer under layer and a radiation sensitive imaging layer. These plates can be imaged with near infrared laser light and developed on-press using inks and fountain solutions.

Thermal lithographic printing plates comprising an overcoat layer are also known. For example, U.S. Pat. Nos. 6,482,571 and 6,541,183 taught to prepare negative-working thermal lithographic printing plates comprising a radiation sensitive under layer and an optional water-soluble polyvinyl alcohol overcoat layer. This optional overcoat layer is transparent and insensitive to light. These plates can be imaged with near infrared laser light and developed on-press using inks and fountain solutions.

U.S. Pat. No. 6,846,614 taught to prepare negative-working thermal lithographic printing plates comprising a radiation sensitive layer and water-soluble overcoat layer obtained from a mixture of polyvinyl alcohol and polyvinyl imidazole. This optional overcoat layer is transparent and insensitive to light. These plates can be imaged with near infrared laser light and developed on-press using inks and fountain solutions.

More generally, the prior art teaches to prepare negative-working thermal lithographic offset printing plates comprising a near infrared laser light sensitive layer. This imaging layer typically includes near infrared absorbing compounds, initiators (either radical or cationic), and binder resins and may also include reactive oligomers, colorants, etc. These plates may comprise an overcoat layer which usually protects the near infrared laser light sensitive layers (imaging layer) from either or both oxygen and moisture and thus prevent the background staining and reduction of the imaging speed normally caused by these species in unprotected printing plates.

However, the initiators typically used in the imaging layers are iodonium salts, sulfonium salts, triazine compounds and the like. These initiators are well known to be sensitive to white light. In fact, these initiators react with white light and cause many problems such as (often severe) background staining. This means that the plates cannot be handled or processed under natural light. To partly overcome this problem, the plates are usually handled under "yellow light", that is white light filtered to remove light with frequencies below about 550 nm.

Another problem with prior art printing plates arises from the fact that they are usually stacked on top of each other during shipping and storage. Since the coatings on these plates are soft and sticky, protective interleaving papers need to be inserted between each of the printing plate to prevent them from scratching and sticking together. This is disadvantageous because the interleaving papers increase costs and must be removed manually prior to imaging (which further add to costs). If the papers are not removed, they will cause paper jams in the automatic plate loading plate-setters used to load the plate in the printing machines.

There thus remains a need for better printing plates that can be handled in white light and that do not require the use of interleaving papers for storage.

The present description refers to a number of documents, the content of which is herein incorporated by reference in their entirety.

SUMMARY OF THE INVENTION

It is an object of the present invention to provide an overcoat composition for thermal lithographic offset printing plates allowing the production an overcoat layer for these plates so that they can be handled and processed in a white light environment and do not require interleaving papers for packaging and transporting.

More specifically, in accordance with the present invention, there is provided a thermal lithographic printing plate overcoat composition comprising a water-soluble polymeric dye having an absorption band between 300 and 600 nm; and micro-particles or nano-particles.

Also, a negative-working thermal lithographic printing plate comprising a hydrophilic substrate; a near infrared imaging layer disposed on the hydrophilic substrate; and an overcoat layer disposed on the imaging layer, the overcoat layer comprising a water-soluble polymeric dye having an absorption band between about 300 and about 600 nm and micro-particles or nano-particles is provided.

Finally, a water-soluble polymeric dye having an absorption band between about 300 and about 600 nm is provided.

In embodiment, this polymeric dye is for use in an overcoat layer for a thermal lithographic printing plate.

In embodiments of the invention, the absorption band may be between about 300 and about 550 nm. More specifically, it may be between about 300 and about 500 nm or between about 300 and about 480 nm.

In embodiments of the invention, the polymeric dye may have attached thereto as a pendant group an azo dye or an aryl amine dye.

In embodiments, the polymeric dye may be of formula:

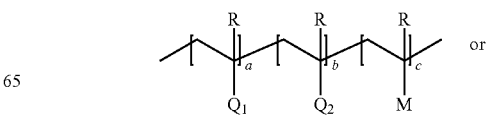

or

-continued

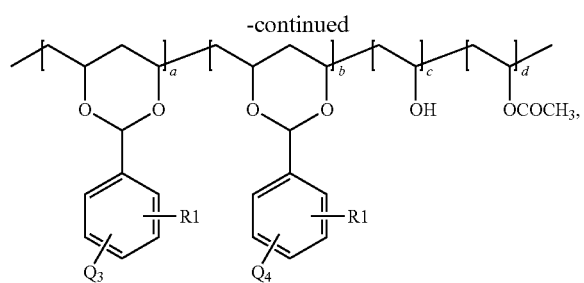

wherein a and c independently vary between about 0.05 and about 0.95; b varies between about 0.00 and about 0.50; d varies between about 0.02 and about 0.20, R represents hydrogen or methyl; R1 represents hydrogen, hydroxy, alkoxy, alkyl, halide, or carboxylic acid; M represents carboxylic acid, 1-imidazole, 2-pyrrolidone, a polyethylene oxide chain, sulfonic acid or phosphoric acid; and $Q_1$, $Q_2$, $Q_3$ and $Q_4$ are the same or different and represent a chromophore having the absorption band.

More specifically, one of $Q_1$, $Q_2$, $Q_3$ and $Q_4$ may be

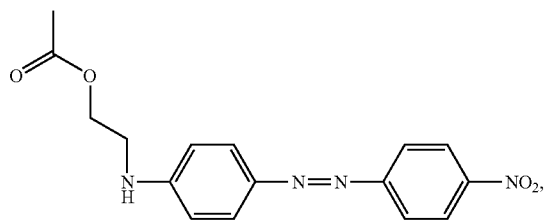

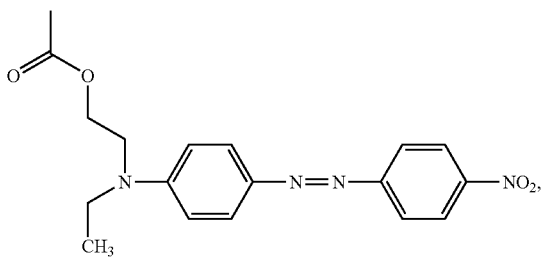

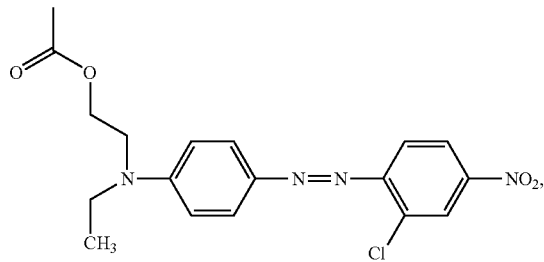

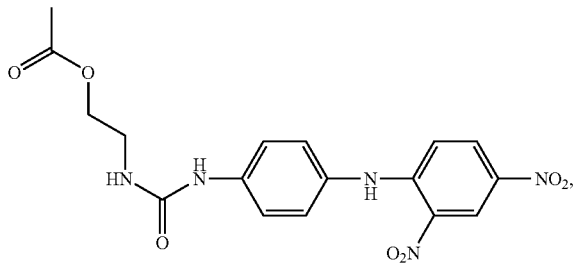

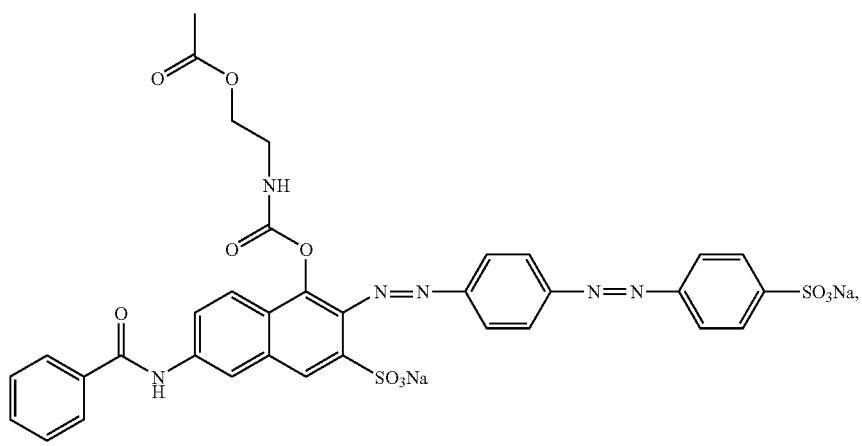

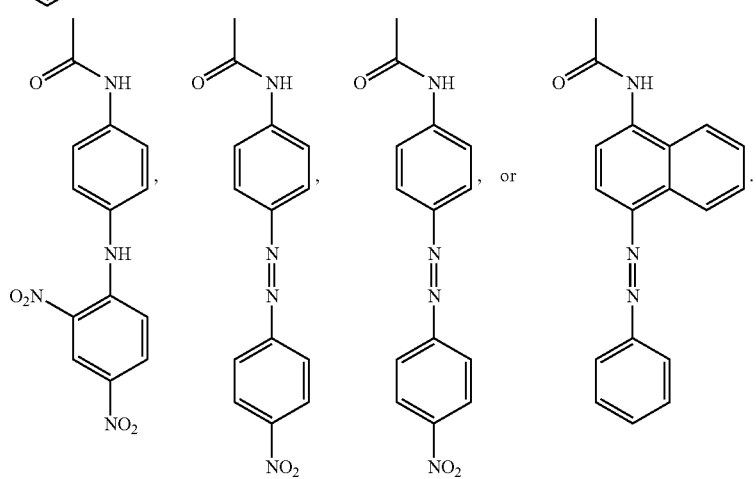

In embodiments of the overcoat composition and of the printing plate, the overcoat composition and the overcoat layer may comprise inorganic nano-particles. More specifically, in embodiments, the inorganic nano-particles may comprise silicon oxide, aluminium oxide, zirconium oxide or zinc oxide. In even more specific embodiments, the inorganic nano-particles may have a particle size of less than about 80 nm.

In embodiments of the overcoat composition and of the printing plate, the overcoat composition and the overcoat layer may comprise organic micro-particles. More specifically, in embodiments, the organic micro-particles may comprise crosslinked copolymers of acrylate or methylmethacrylate with styrene, 2-hydroxy ethylmethacrylate, methacrylate, poly(ethylene oxide) methacrylate or a linear or branched alkyl methacrylate. In even more specific embodiments, the organic micro-particles may have a particle size of between about 2 and about 8 μm.

In embodiments of the overcoat composition, the overcoat composition may further comprise an aqueous solvent.

In embodiments of the printing plate, the imaging layer may comprise near infrared absorbing polymeric nano-particles and reactive iodonium oligomers. In more specific embodiments, the imaging layer may further comprise a reactive polymeric binder resin.

DETAILED DESCRIPTION OF THE INVENTION

Overcoat Compositions

Turning now to the present invention in more detail, there is provided a thermal lithographic printing plate overcoat composition. When coated on a printing plate, this overcoat composition provides an overcoat layer that allows (1) handling the plates in white light while reducing or essentially or entirely eliminating background staining, and (2) packaging and transporting the plates without interleaving papers. Furthermore, this overcoat layer acts as an oxygen and moisture impermeable protective layer and thus prevents background staining from $O_2$ and $H_2O$ as well as the reduction in laser imaging speed that normally occurs in unprotected plates.

More specifically, the overcoat composition of the invention comprises (A) a water-soluble polymeric dye having an absorption band between about 300 and about 600 nm and (B) micro-particles or nano-particles.

In specific embodiments, the water-soluble polymeric dye may have an absorption band between about 300 and about 550 nm, between about 300 and about 500 nm or between about 300 and about 480 nm.

The inventors are the first to provide an overcoat composition comprising a water-soluble polymeric dye having an absorption band between about 300 and about 600 nm. This polymeric dye, when in an overcoat layer coated on a printing plate, will absorb light at the deleterious wavelengths so that this light doesn't reach the imaging layer where it causes undesirable background staining. Furthermore, in contrast to molecular dyes, this polymeric dye is stable and won't phase separate or migrate/diffuse within the overcoat layer and/or the other layers of the printing plate. Finally, this polymeric dye provides an effective $O_2$ and $H_2O$ barrier.

The polymeric dye is water-soluble, which means that it is dissolved by water. More specifically, in embodiments, the water-soluble polymeric dye has a solubility in water of at least 50 mg/mL.

As used herein, a polymeric dye means a polymer that absorbs light at one or more given wavelength. For example, this polymer can have one or more absorption band (also called absorption peak) between about 300 and about 600 nm. To achieve this, the polymer may comprise one or more chromophore. These chromophores may be part of the backbone of the polymer or they may be attached as pendant groups to this backbone.

As used herein, a "chromophore" refers to a non-polymeric molecule that has one or more absorption band (also called absorption peak) in the wavelength region of interest. More specifically, the chromophore may have at least one absorption band between about 300 and about 600 nm.

The chromophore may be any chromophore having one or more absorption band in the wavelength region of interest known to person of ordinary skill in the art. In embodiments, the chromophore may be an azo dye or an aryl amine dye.

As used herein, an "azo dye" has its usual meaning in the art. More specifically, the "azo dye" can be understood as being a chromophore comprising an azo functional group, i.e. two double bonded nitrogen atoms: R—N=N—R'. In embodiments, the R and R' groups are aromatic, which helps stabilize the N=N group by making it part of an extended delocalized system.

As used herein, an "aryl amine dye" has its usual meaning in the art. More specifically, the "aryl amine dye" can be understood to be a chromophore comprising an aryl amine group, i.e. an aryl group having attached thereto a nitrogen atom: Aryl-N($R_1$)($R_2$), wherein $R_1$ and $R_2$ independently are hydrogen, alkyl or aryl. In embodiments, alkyl may be linear, branched or cyclic $C_1$-$C_{12}$ and aryl may comprise between 5 and 12 carbon atoms.

In embodiments, the water-soluble polymeric dye may be of formula:

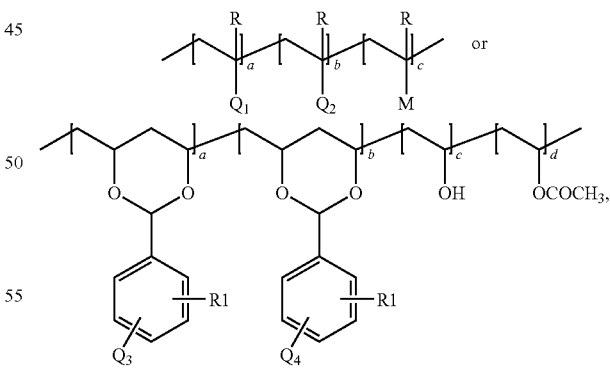

wherein:
a and c are molar ratios that may independently vary between about 0.05 to about 0.95;
b is a molar ratio that may vary between about 0.00 and about 0.50;
d is molar ratio that may vary between about 0.02 and about 0.20;

R is hydrogen or methyl;

R1 is hydrogen, hydroxy, alkoxy, alkyl, halide, or carboxylic acid;

M is carboxylic acid, 1-imidazole, 2-pyrrolidone, polyethylene oxide chain, sulfonic acid or phosphoric acid; and $Q_1$, $Q_2$, $Q_3$ and $Q_4$ independently represent a chromophore having the above-mentioned absorption band.

In these formulas, "b" can be 0, which means that the middle segment of these formulas (the segment contained within the brackets having "b" as an index) is optional. Thus, in embodiments, this middle segment can be absent from the above chemical structures.

In embodiments, alkoxy and alkyl may comprise between 1 and 12 carbon atoms. Also, in embodiments, halide may be F, Cl, Br or I.

As used herein, a "polyethylene oxide chain" refers to —($CH_2$—$CH_2$—O—)$_n$—. In embodiments, "n" may be up to about 50.

Chromophores $Q_1$, $Q_2$, $Q_3$ and $Q_4$ may all be the same or they may be different from each other. In embodiments, it may be advantageous to have a mixture of chromophore having absorption bands at different wavelengths so that a broader part of the spectrum is absorbed by the overcoat layer and therefore is prevented to reach the imaging layer. Similarly, in embodiments, the overcoat composition may comprise a mixture of polymeric dyes.

It is to be understood that although the chemical structures above show only 2 different chromophores in each polymeric dye. In fact, the polymeric dyes can comprise more than 2 different types of chromophore and the present invention is intended to cover these polymeric dyes as well.

In embodiments, any of $Q_1$, $Q_2$, $Q_3$ and/or $Q_4$ chromophores may be azo and aryl amine dyes of formula (wherein the maxima of the absorption band is in parentheses):

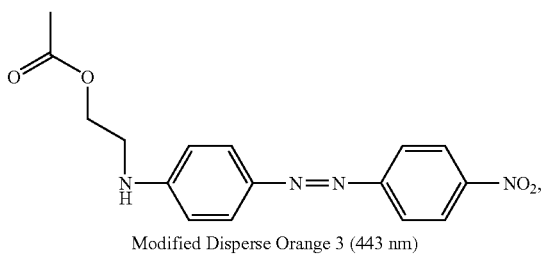

Modified Disperse Orange 3 (443 nm)

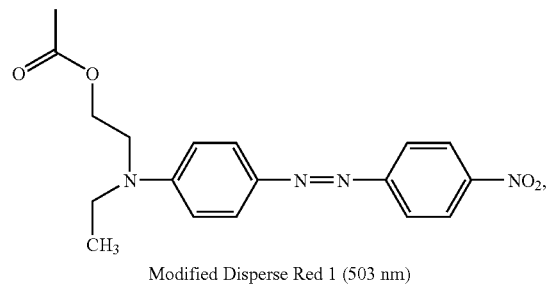

Modified Disperse Red 1 (503 nm)

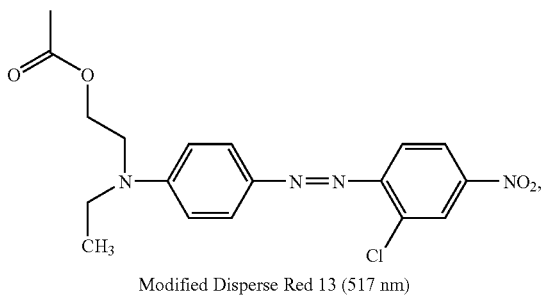

Modified Disperse Red 13 (517 nm)

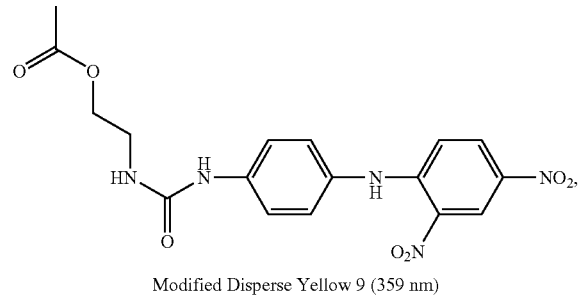

Modified Disperse Yellow 9 (359 nm)

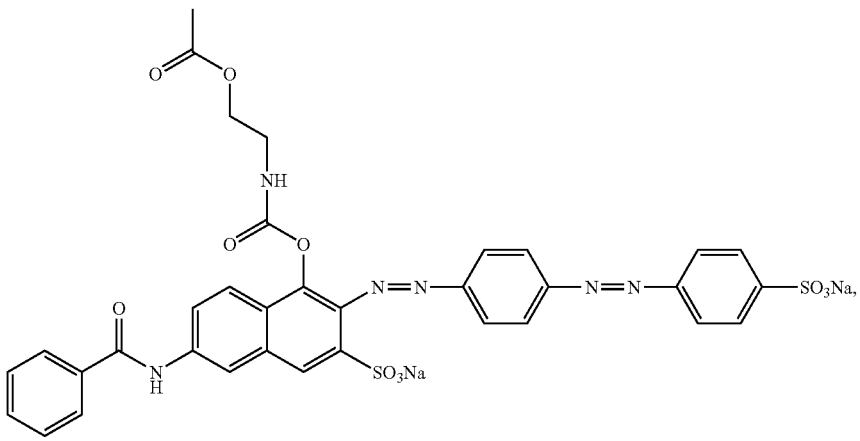

Modified Direct Red 81 (508 nm)

-continued

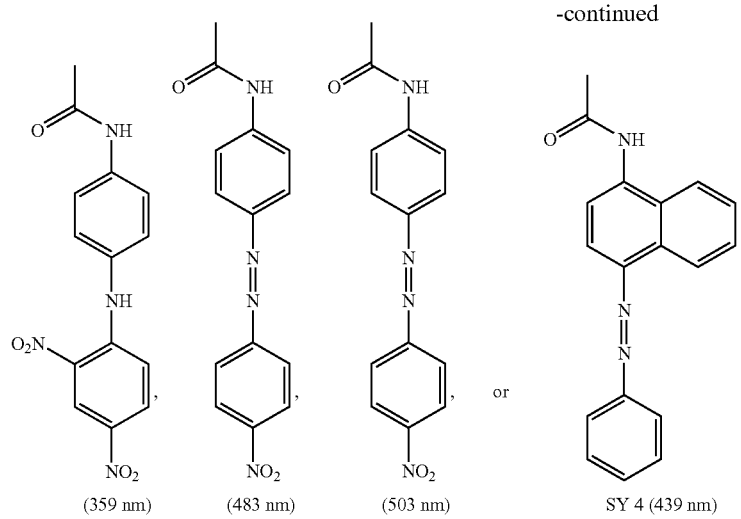

As stated above, the overcoat composition of the invention comprises micro-particles or nano-particles. The inventors are the first to provide an overcoat composition comprising such particles. The inventors have found that the presence of these particles within an overcoat layer increases the hardness of the overcoat layer, thus rendering it more resistant to scratching and less sticky, which eliminates the need for interleaving paper during packaging and storage.

As used herein, "micro-particles" are particles having particle size between about 0.1 and about 20 μm and "nano-particle" are particles having a particle size between about 10 and about 100 nm.

In embodiments, the overcoat composition may comprise a mixture of micro-particles and/or nano-particles.

The exact nature of the particles used in the overcoat composition is of little importance. Thus, the particles in the overcoat composition may be made of inorganic or organic materials. More specifically, in embodiments, the particles may be inorganic nano-particles or organic micro-particles.

In embodiments, the inorganic nano-particles may be made of metal oxide, such as silicon oxide, aluminum oxide, zirconium oxide, and zinc oxide. In specific embodiments, these particles may have a particle size of less than about 80 nm. In more specific embodiments, the inorganic nano-particles may advantageously be:

| Name | Description and manufacturers |
|---|---|
| AERODISP® W 440 | Water bone dispersion of nano silica particle (40% solid), available from Degussa, United States |
| ADP50 | High purity alumina nano-particles (<50 nm), available from Forever Chemical Co., Taiwan |
| TiO$_2$ Nano powder | Particle size less than 40 nm, available from Hefei Jiankun Chemical, China |

In embodiments, the organic micro-particles may be polymeric. More specifically, the organic micro-particles may be made of crosslinked copolymers of acrylate or methylmethacrylate with styrene, 2-hydroxy ethylmethacrylate, methacrylate, poly(ethylene oxide) methacrylate, and other linear or branched alkyl methacrylate. In embodiments, the linear or branched alkyl methacrylate may comprise from about 2 to about 20 carbon atoms. In specific embodiments, these particles may have a particle size between 2 and 8 μm. In more specific embodiments, the organic micro-particles may be those available from American Dye Source, Inc. (Canada) under the trade-names Thermolak® NP02 (methylmethacrylate copolymers organic particles having a particle size of about 2 μm) and Thermolak® NP08 (methylmethacrylate copolymers organic particles having a particle size of about 8 μm).

In embodiments, the overcoat composition may further comprise an aqueous solvent, such as for example, water and more specifically, de-ionized water.

In embodiments, the overcoat composition may comprise between about 1 and about 15 wt % of solid content (i.e. polymeric dye and micro- and/or nano-particles) in the aqueous solvent. In embodiments, the solid content of the overcoat composition may comprise between about 80 and about 98 wt % of the polymeric dye and between about 2 and about 20 wt % of the micro- and/or nano-particles.

Thermal Lithographic Printing Plates

This invention further relates to negative-working thermal lithographic offset printing plates comprising (A) a hydrophilic substrate, (B) a near infrared imaging layer disposed on the hydrophilic substrate, and (C) an overcoat layer disposed on the imaging layer, wherein the overcoat layer comprises a water-soluble polymeric dye having an absorption band between about 300 and about 600 nm; and micro-particles or nano-particles.

More specifically, the polymeric dye, the micro-particles and the nano-particles in the overcoat layer are as defined above with respect to the overcoat composition.

In embodiments, the overcoat layer may be produced from the above-described overcoat composition by (1) if the overcoat composition does not comprise a solvent, adding an aqueous solvent to the overcoat composition, (2) disposing the overcoat composition on the imaging layer and (3) allowing the solvent to evaporate, thus producing an overcoat layer comprising a water-soluble polymeric dye having an absorption band between about 300 and about 600 nm and micro-particles or nano-particles.

The hydrophilic substrate used in the printing plate can be any such substrate known to the person of skill in the art. Non limiting examples of substrates include anodized aluminum, plastic films or paper.

Aluminum substrates may be brushed or electrolytic grained aluminum, then anodized with an acidic solution. The anodized aluminum substrate may be post-treated with water solutions containing poly(acrylic acid), poly(acrylic acid-co-vinylphosphoric acid) or polyvinyl phosphoric acid, and then dried at about 110° C.

In embodiments, the substrate may be polyester coated with a hydrophilic layer comprising silica, alumina or titanium oxide crosslinked with polymers, such as polyvinyl alcohol and polyvinyl acetal copolymers.

The near infrared (NIR) imaging layer is a layer sensitive to laser near infrared radiation. Upon their exposure to NIR light, areas of this layer undergo chemical and/or physical changes and thereby record an image. Upon development, the image is revealed which allows printing. The plates may be developed "on-press" (the non-exposed areas of the image are removed by the inks and the fountain solution) or "off-press" (an aqueous developer is used to remove the non-exposed areas of the layer).

The imaging layer may be any such layer known to the person of skill in the art. Typically, imaging layers comprise a NIR chromophore, an initiator and a reactive binder resin. They may also comprise sensitizers, colorants, stabilizers, image-protecting agents as well as other agents.

The near infrared imaging layer is disposed on the hydrophilic substrate. However, it is to be understood that, in embodiments, there may be one or more layer between the substrate and the imaging layer.

In embodiments, the imaging layer may weigh between about 0.80 and about 2.50 g/m$^2$.

In embodiments, the near infrared imaging layer is that disclosed in U.S. patent application 60/823415 filed on Aug. 26, 2006, the content of which is incorporated herein. This near infrared imaging layer comprises near infrared absorbing polymeric nano-particles and reactive iodonium oligomers. This imaging layer may also comprise a reactive polymeric binder resin, colorants, stabilizers, sensitizers, etc.

In more specific embodiments, the near infrared absorbing polymeric nano-particles of this imaging layer are that commercially available from American Dye Source, Inc. (Canada) under trade-name Thermolak® NIP830. These particles have a strong absorption band between 780 and 840 nm and an average particle size of 260 nm. The chemical structure of Thermolak® NIP830 is shown in FIG. 1 wherein w represents the number ethylene oxide repeating unit, which is around 50, and wherein a, k, h, and l are, 0.100, 0.750, 0.145, and 0.005, respectively.

In other specific embodiments, the reactive iodonium oligomer of this imaging layer is that commercially available from American Dye Source, Inc. (Canada) under trade-name Tuxedo® 06C051D. This reactive iodonium oligomer is a mixture of the compounds shown in FIGS. 2, 3 and 4, wherein w represents the number of ethylene oxide repeating unit, which is around 7.

In yet other specific embodiments, the reactive polymeric binder resin of this imaging layer is that commercially available from American Dye Source, Inc. under trade-name Tuxedo® XAP02. This reactive polymeric binder resin is a hydroxyethyl cellulose comprising pendant radical reactive methacrylate functional group. The chemical structure of Tuxedo® XAP02 is shown in FIG. 5.

The overcoat layer is disposed on the near infrared imaging layer. However, it is to be understood that, in embodiments, there may be one or more other layer between the imaging layer and the overcoat layer.

The overcoat layer filters out deleterious wavelengths of white light but is transparent to NIR radiation so the imaging layer can be imaged as part of the printing process.

After imaging, the overcoat layer is removed during development (concurrently with the non exposed areas of the imaging layer). The overcoat layer should therefore be sufficiently soluble in water so that it is removed by the aqueous developer or the fountain solution. This is possible because, as described above, the polymeric dye used in the overcoat composition is water-soluble. The micro- and nano-particles of the overcoat composition need not be water-soluble as they will disperse in the aqueous developer or the fountain solution. In fact, when the overcoat composition is coated using an aqueous solvent, the micro- and nano-particles should optimally be insoluble in this aqueous solvent so as to still be in the form of particles once in the coated layer.

Furthermore, in embodiments, the imaging layer is solvent-soluble (in contrast with water-soluble), so it is advantageous that the overcoat layer be coated using an aqueous solvent, because it avoids using other solvents that could damage the imaging layer.

In embodiments, the overcoat layer may weigh between about 0.30 and about 2.50 g/m$^2$.

In embodiments, the overcoat layer may comprise between about 80 and about 98 wt % of the polymeric dye and between about 2 and about 20 wt % of the micro- and/or nano-particles.

Polymeric Dyes

The present invention also relates to the polymeric dyes described above with respect to the overcoat composition. For certainty, these polymeric dyes are described again here.

There is provided a water-soluble polymeric dye having an absorption band between about 300 and about 600 nm.

In specific embodiments, the water-soluble polymeric dye may have an absorption band between about 300 and about 550 nm, between about 300 and about 500 nm or between about 300 and about 480 nm.

This polymeric dye, when in an overcoat layer coated on a printing plate, will absorb light at the deleterious wavelengths so that this light doesn't reach the imaging layer where it causes undesirable background staining. In contrast to molecular dyes, this polymeric dye is stable and won't phase separate or migrate/diffuse within the overcoat layer and/or the other layers of the printing plate. Finally, this polymeric dye provides an effective $O_2$ and $H_2O$ barrier.

The polymeric dye is water-soluble, which means that it is dissolved by water. More specifically, in embodiments, the water-soluble polymeric dye has a solubility in water of at least 50 mg/mL.

Again, as used herein, a polymeric dye means a polymer that absorbs light at one or more given wavelength. For example, this polymer can have one or more absorption band (also called absorption peak) between about 300 and about 600 nm. To achieve this, the polymer may comprise one or more chromophore. These chromophores may be part of the backbone of the polymer or they may be attached as pendant groups to this backbone.

Again, as used herein, a "chromophore" refers to a non-polymeric molecule that has one or more absorption band (also called absorption peak) in the wavelength region of interest. More specifically, the chromophore may have at least one absorption band between about 300 and about 600 nm.

The chromophore may be any chromophore having one or more absorption band in the wavelength region of interest known to person of ordinary skill in the art. In embodiments, the chromophore may an azo dye or an aryl amine dye.

Again, as used herein, an "azo dye" has its usual meaning in the art. More specifically, the "azo dye" can be understood as being a chromophore comprising an azo functional group, i.e. two double bonded nitrogen atoms: R—N=N—R'. In embodiments, the R and R' groups are aromatic, which helps stabilize the N=N group by making it part of an extended delocalized system.

Again, as used herein, an "aryl amine dye" has its usual meaning in the art. More specifically, the "aryl amine dye" can be understood as a chromophore comprising an aryl amine group, i.e. an aryl group having attached thereto a nitrogen atom: Aryl-N($R_1$)($R_2$), wherein $R_1$ and $R_2$ independently are hydrogen, alkyl or aryl. In embodiments, alkyl may be linear, branched or cyclic $C_1$-$C_{12}$ and aryl may comprise between 5 and 12 carbon atoms.

In embodiments, the water-soluble polymeric dye may of formula:

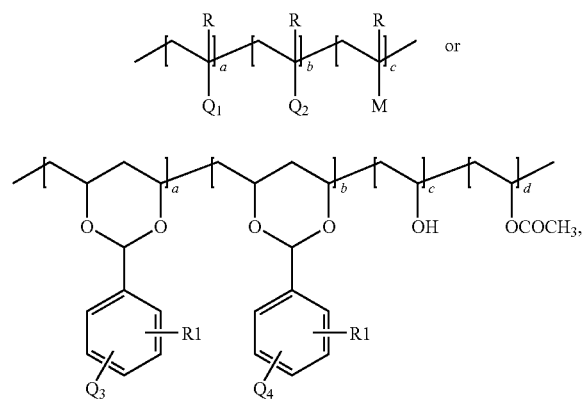

wherein:
a and c are molar ratios that may vary independently between about 0.05 to about 0.95;

b is a molar ratio that may vary between about 0.00 and about 0.50;

d is a molar ratio that may vary between about 0.02 and about 0.2;

R is hydrogen or methyl;

R1 is hydrogen, hydroxy, alkoxy, alkyl, halide, or carboxylic acid;

M is carboxylic acid, 1-imidazole, 2-pyrrolidone, polyethylene oxide chain, sulfonic acid or phosphoric acid; and $Q_1$, $Q_2$, $Q_3$ and $Q_4$ independently represent a chromophore having the above-mentioned absorption band.

In these formulas, "b" can be 0, which means that the middle segment of these formulas (the segment contained within the brackets having "b" as an index) is optional. Thus, in embodiments, this middle segment can be absent from the above chemical structures. In embodiments, alkoxy and alkyl may comprise between 1 and 12 carbon atoms. Also, in embodiments, halide may be F, Cl, Br or I. Again, as used herein, a "polyethylene oxide chain" refers to —($CH_2$—$CH_2$—O—)$_n$—. In embodiments, "n" may be up to about 50.

Chromophores $Q_1$, $Q_2$, $Q_3$ and $Q_4$ may all be the same or they may be different from each other. In embodiments, it may be advantageous to have a mixture of chromophore having absorption bands at different wavelengths so that a broader part of the spectrum is absorbed by the overcoat layer and therefore is prevented to reach the imaging layer.

It is to be understood that although the chemical structures above show only 2 different chromophores in each polymeric dye. In fact, the polymeric dyes can comprise more than 2 different types of chromophore and the present invention is intended to cover these polymeric dyes as well.

In embodiments, any of $Q_1$, $Q_2$, $Q_3$ and/or $Q_4$ chromophores may be azo and aryl amine dyes of formula (wherein the maxima of the absorption band is in parentheses):

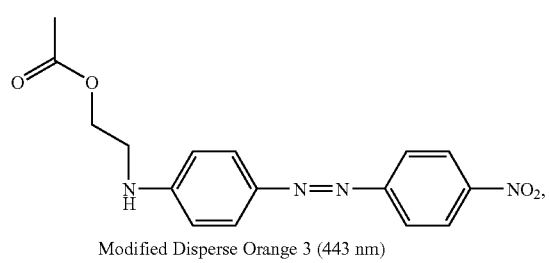

Modified Disperse Orange 3 (443 nm)

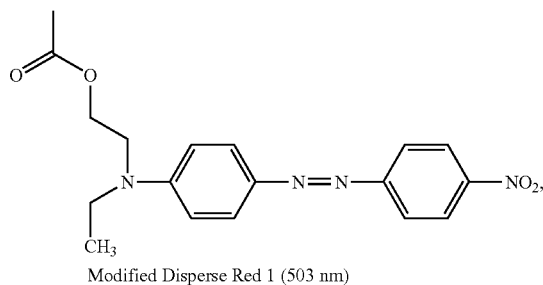

Modified Disperse Red 1 (503 nm)

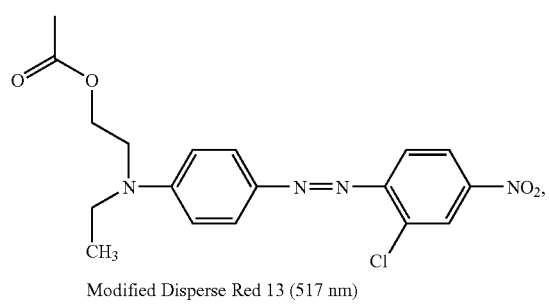

Modified Disperse Red 13 (517 nm)

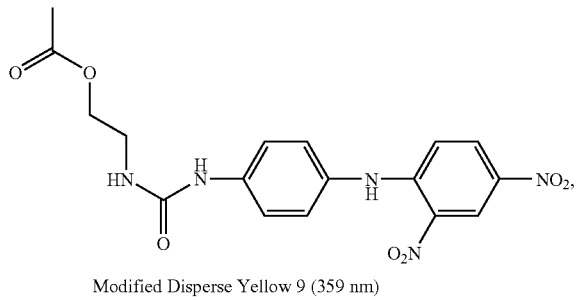

Modified Disperse Yellow 9 (359 nm)

-continued

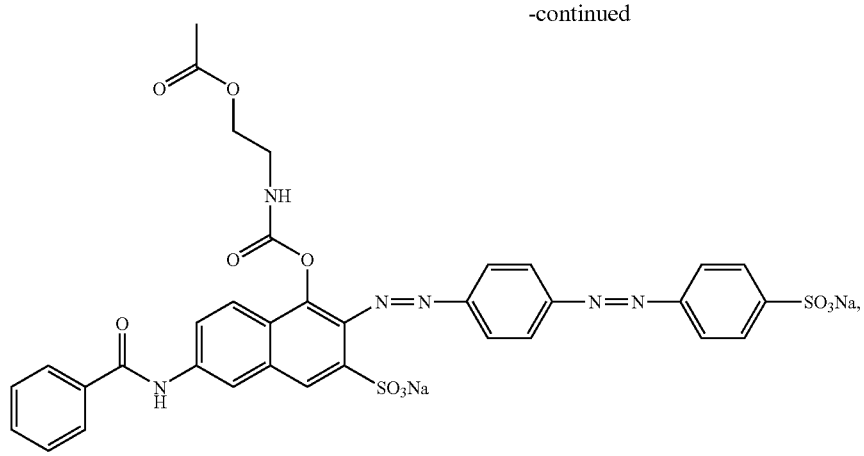

Modified Direct Red 81 (508 nm)

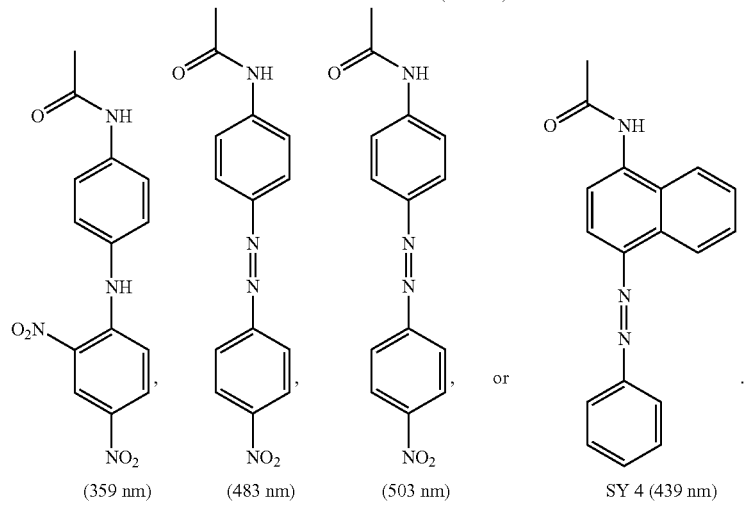

(359 nm)   (483 nm)   (503 nm)   SY 4 (439 nm)

As used herein "about" means plus or minus 5% of the value so quantified.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Preparation of Water-Soluble Polymeric Dyes

Water-soluble polymeric dyes were synthesized in a three neck flask equipped with a mechanical stirrer, a water condenser, a heating mantle, a temperature controller and a nitrogen gas inlet. The molecular weight of the obtained polymers was measured using a gel permeable chromatographic system (Model Breeze, available from Waters, Canada). The UV-Vis spectra of the polymeric dyes in water solution were obtained using a UV-Vis spectrophotometer (Model Lambda 35, available from Perkin Elmer, Canada).

The following materials were used to produce the water-soluble polymeric dyes:

| | |
|---|---|
| Monomer | Acrylic acid[1] |
| | 1-vinylimidazole[1] |
| | 1-vinyl-2-pyrrolidone |
| Polymer | Celvol 103: Polyvinyl alcohol-98% hydrolyzed polyvinyl acetate having an average molecular weight of about 18,000 |
| Visible dye monomer | Disperse Red 1 Acrylate[1] |
| | Disperse Red 13 Acrylate[1] |
| | Direct Red 81 Methacrylate |

-continued

| Visible dye chromophore | DNAB: 4-(2,4-dinitroanilino)benzaldehyde[2]<br>Disperse Yellow 9[1]<br>Disperse Orange 3 |

Available from [1]Sigma-Aldrich, Canada and [2]American Dye Source, Inc., Canada.

Example 1

Water-soluble polymeric dye, PD1-01 was synthesized by adding 84.7 grams (0.9 moles) of 1-vinylimidazole and 3.68 grams (0.1 moles) of Disperse Red 1 Acrylate into 700 ml of de-ionized water in a three neck flask. The solution was heated at 80° C. under nitrogen atmosphere for 30 minutes. Under constant stirring, 10 grams of 2,2'-azobis(2-methylpropionamidine) dihydrochloride (which acts as a free radical initiator) suspension in water were added and the solution was refluxed for 1 hour. Subsequently, 5 grams of 2,2'-azobis(2-methylpropionamidine) dihydrochloride were added and the solution was again refluxed for one hour. Finally, 5 grams of 2,2'-azobis(2-methylpropionamidine) dihydrochloride were added and the solution was heated at 80° C. for 10 hours.

Figure 1:
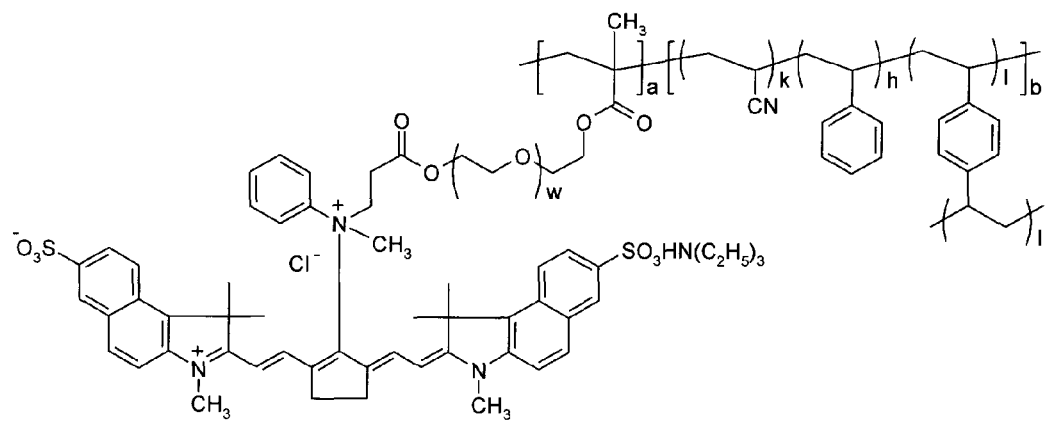
FIG. 1 is the chemical structure of Thermolak® NIP830.
Figure 2:
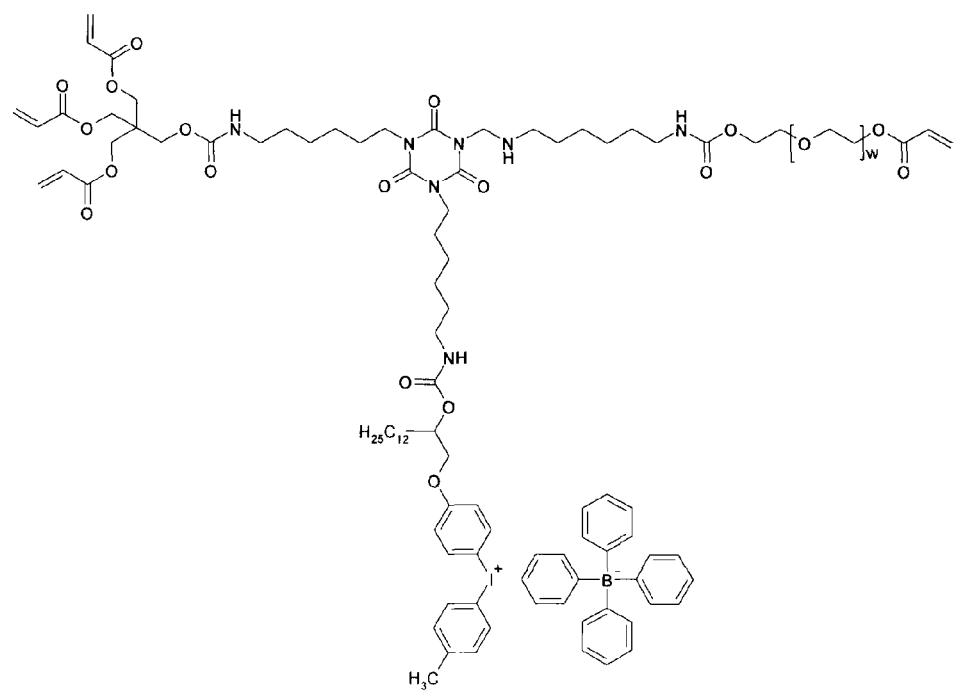
FIG. 2 is one of the component of the reactive iodonium oligomer sold under trade-name Tuxedo® 06C051D.
Figure 3:
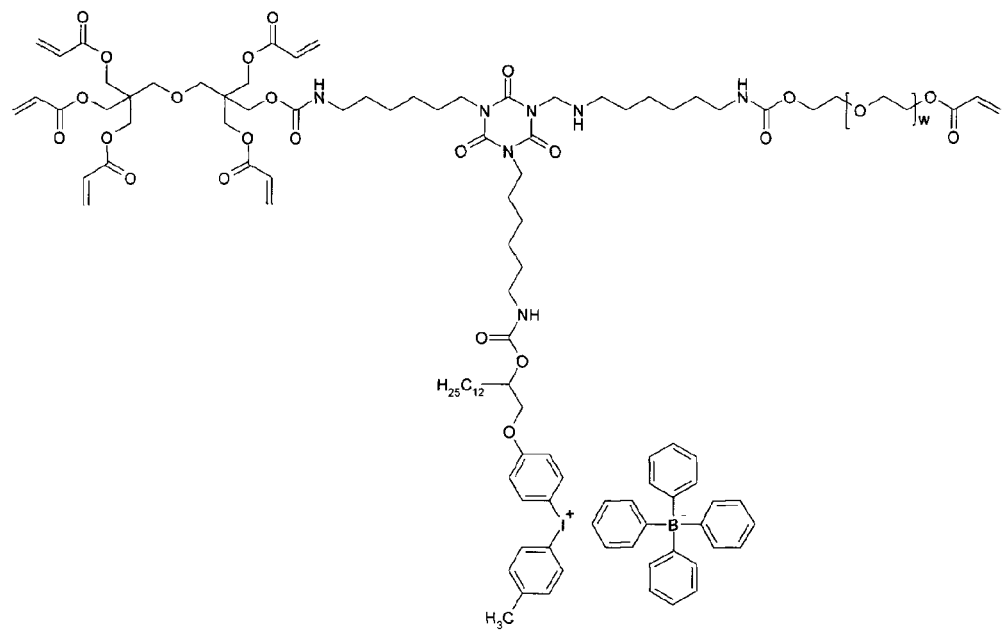
FIG. 3 is one of the component of the reactive iodonium oligomer sold under trade-name Tuxedo® 06C051D.
Figure 4:
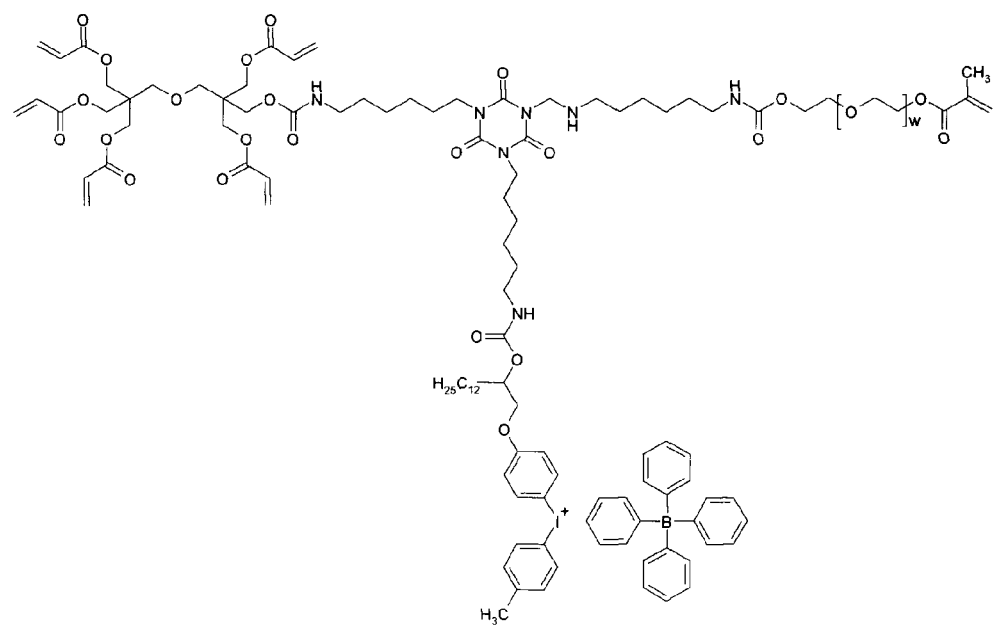
FIG. 4 is one of the component of the reactive iodonium oligomer sold under trade-name Tuxedo® 06C051D.
Figure 5:
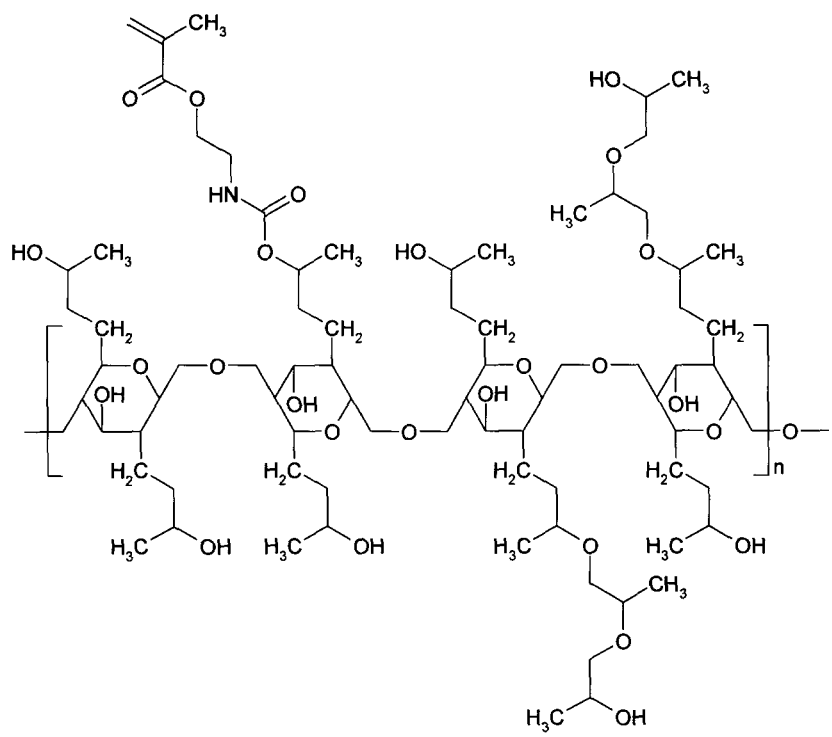
FIG. 5 is the chemical structure of Tuxedo® XAP02.
Figure 6:
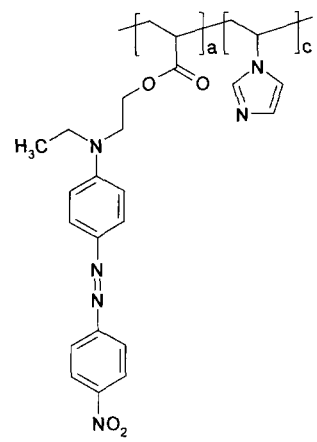
FIG. 6 is the ideal chemical structure of PD1-01.

A reddish solution of polymeric dye was obtained and the solid content was adjusted to 10% with de-ionized water. The maximum absorption band of the obtained polymeric dye was observed at around 503 nm. The obtained product was ready for use in the preparation of the overcoat solutions. The chemical structure of PD1-01 is shown in FIG. 6, wherein a and c are 0.1 and 0.9, respectively.

Example 2

Water-soluble polymeric dye, PD1-02 was synthesized by adding 100.0 grams (0.9 moles) of 1-vinyl-2-pyrrolidone and 4.0 grams (0.1 moles) of Disperse Red 13 Acrylate into 700 ml of de-ionized water in a three neck flask. The solution was heated at 80° C. under nitrogen atmosphere for 30 minutes. Under constant stirring, 10 grams of 2,2'-azobis(2-methylpropionamidine) dihydrochloride suspension in water were added and the solution was refluxed for 1 hour. Subsequently, 5 grams of 2,2'-azobis(2-methylpropionamidine) dihydrochloride were added and the solution was again refluxed for one hour. Finally, 5 grams of 2,2'-azobis(2-methylpropionamidine) dihydrochloride were added and the solution was heated at 80° C. for 10 hours.

Figure 7:
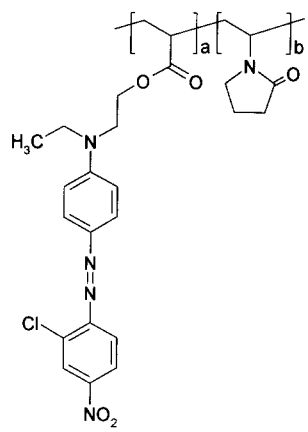
FIG. 7 is the ideal chemical structure of PD1-02.

A reddish solution of polymeric dye was obtained and the solid content was adjusted to 10% with de-ionized water. The maximum absorption band of the obtained polymeric dye was observed at around 503 nm. The obtained product was ready for use in the preparation of the overcoat compositions. The chemical structure of PD1-02 is shown in FIG. 7, wherein a and b are 0.1 and 0.9, respectively.

Example 3

Water-soluble polymeric dye, PD1-03, was synthesized by adding 64.8 grams (0.95 moles) of acrylic acid and 4.2 grams (0.05 moles) of Direct Red 81 Methacrylate into 700 ml of de-ionized water in a three neck flask. The solution was heated at 80° C. under nitrogen atmosphere for 30 minutes. Under constant stirring, 10 grams of 2,2'-azobis(2-methylpropionamidine) dihydrochloride suspension in water were added and the solution was refluxed for 1 hour. Subsequently, 5 grams of 2,2'-azobis(2-methylpropionamidine) dihydrochloride were added and the solution was again refluxed for one hour. Finally, 5 grams of 2,2'-azobis(2-methylpropionamidine) dihydrochloride were added and the solution was heated at 80° C. for 10 hours.

Figure 8:
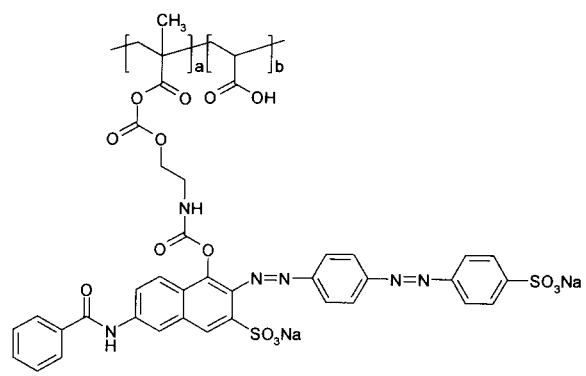
FIG. 8 is the ideal chemical structure of PD1-03.

A reddish solution of polymeric dye was obtained and the solid content was adjusted to 10% with de-ionized water. The maximum absorption band of the obtained polymeric dye was observed at around 503 nm. The obtained product was ready for use in the preparation of the overcoat compositions. The chemical structure of PD1-03 is shown in FIG. 8, wherein a and b are 0.05 and 0.95, respectively.

Example 4

Water-soluble polymeric dye PD2-01 was synthesized by adding 44 grams of Celvol™ 103 to a reaction flask containing 220 ml of dimethylsulfoxide (DMSO) at 60° C., under nitrogen atmosphere and constant stirring. After complete dissolution of the polymer in DMSO, 2.0 ml of concentrated sulfuric acid, which acts as a catalyst for this reaction, were added to the flask. After thirty minutes, 2.03 grams of DNAB (50 mmoles) were slowly added to the flask and the mixture was stirred at 60° C. for 5 hours. The polymer was precipitated in acetone, filtered and washed copiously with a mixture of acetone and ethanol until the filtrate became colorless.

Figure 9:
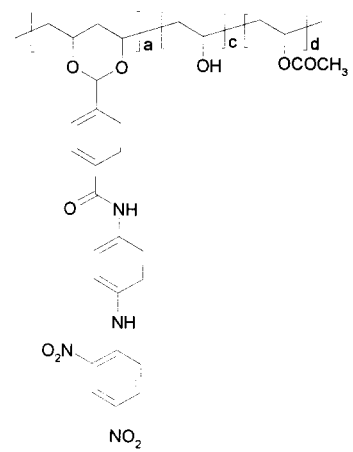
FIG. 9 is the ideal chemical structure of PD2-01.

A brownish polymeric dye was obtained after drying in air. The ideal structure of PD2-01 is shown in FIG. 9, wherein a, c and d are 0.20, 0.78 and 0.02, respectively.

Example 5

Water-soluble polymeric dye, PD2-02 was synthesized by adding 44 grams of Celvol™ 103 to a reaction flask containing 220 ml of dimethylsulfoxide (DMSO) at 60° C., under nitrogen atmosphere and constant stirring. After complete dissolution of the polymer in DMSO, 2.0 ml of concentrated sulfuric acid, which acts as a catalyst for this reaction, were added to the flask. After thirty minutes, 4.8 grams of 4-carboxy benzaldehyde (100 mmoles, available from American Dye Source Inc., Canada) were slowly added to the flask and the mixture was stirred at 60° C. for 5 hours. A Dean trap was installed on the reaction flask. Then, 80 ml of toluene, 2.8 grams of disperse orange 3 and 1.6 grams of disperse yellow 9 were slowly added into the reaction. The reaction was heated to 110° C. and by-product water was produced and appeared in the Dean trap. The reaction was stopped after 10 hours, when water was no longer produced by the reaction. The polymeric dye was precipitated in acetone, filtered and washed copiously with a mixture of acetone and ethanol until the filtrate became colorless.

Figure 10:
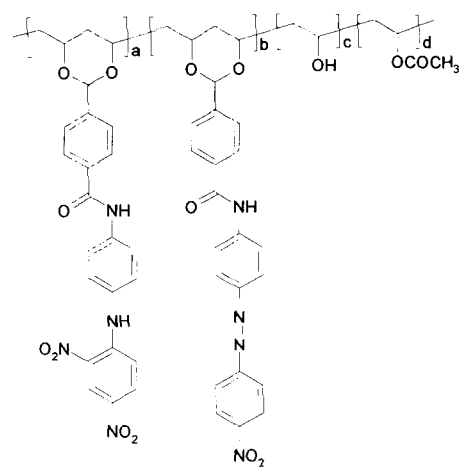
FIG. 10 is the ideal chemical structure of PD2-02.

A brownish polymeric dye was obtained after drying in air. An ideal structure of PD2-02 is shown in FIG. 10, wherein a, b c and d are 0.10, 0.10 0.78 and 0.02, respectively.

Preparation of Water-Soluble Overcoat Solutions

Overcoat compositions were prepared by slowly dissolving the above polymeric dyes into de-ionized water using a high shear mixer (Model L4RT-A, available from Silverson, United States) and adding organic or inorganic particles to produce the final dispersion. The overcoat compositions were adjusted to have about 10 wt % of solid content (i.e. polymeric dye and particles).

In addition to the polymeric dyes prepared in the previous examples, the following materials were used in the preparation of the overcoat compositions:

| | |
|---|---|
| Nano- or micro-particles | AERODISP ®W 440 - Water bone dispersion of nano silica particle (40% solid in water)[1] Thermolak NP08 - methylmethacrylate copolymers organic particles (having a particle size of about 8 μm)[2] ADP50 Nano powder - High purity alumina nano-particle (<50 nm)[3] |
| Water-soluble polymer | Celvol ® 103 Polyvinyl imidazole (10% solid solution in water)[2] |

Available from [1]Degussa, USA; [2]American Dye Source, Inc., Canada; and [3]Forever Chemical Co., Taiwan.

Examples 6-11

Six overcoat compositions according to the present invention were prepared. These compositions comprised water, polymeric dyes and organic or inorganic micro- or nano-particles. More specifically, these compositions comprised the following:

| | EXAMPLES (Parts) | | | | | |
|---|---|---|---|---|---|---|
| Ingredients | 6 | 7 | 8 | 9 | 10 | 11 |
| De-ionized water | 70 | 70 | 70 | 70 | 70 | 70 |
| PD2-01 | 8.0 | 8.0 | 8.0 | 0 | 0 | 0 |
| PD2-02 | 0 | 0 | 0 | 8.0 | 8.0 | 8.0 |
| PD1-01 | 20 | 20 | 20 | 20 | 0 | 0 |
| PD1-02 | 0 | 0 | 0 | 0 | 20 | 0 |
| PD1-03 | 0 | 0 | 0 | 0 | 0 | 20 |
| AERODISP ® W440 | 1.0 | 0 | 0 | 1.0 | 1.0 | 1.0 |
| ADP50 | 0 | 0.4 | 0 | 0 | 0 | 0 |
| Thermolak ® NP08 | 0 | 0 | 0.4 | 0 | 0 | 0 |

Example 12 and 13 (Comparative)

For comparison, polymeric overcoat compositions not comprising polymeric dyes or particles were prepared. These overcoat compositions were similar to that proposed in the prior art and, more specifically, comprised the following:

| | Examples (parts) | |
|---|---|---|
| Ingredients | 12 | 13 |
| De-ionized water | 70 | 70 |
| Celvol ® 103 | 8 | 10 |
| Polyvinyl imidazole | 20 | 0 |

Homogeneous colorless polymeric solutions were obtained. These solutions were used without filtration.

Preparation of a Near Infrared Laser Imaging Coating Solution

The following materials were used to prepare a near infrared laser imaging layer:

| | |
|---|---|
| Near infrared polymeric particle | Thermolak ® NIP830 (20% solid in propanol and water solution)[1] |
| Reactive cellulose | Tuxedo ® XAP02 (10% solid in 1,3-dioxolane)[1] |
| Reactive iodonium oligomer mixture | Tuxedo ® 06051D (85% solid in 1,3-dioxolane)[1] |
| Stabilizer | 3-Mercapto triazole[2] |
| Blue 503 | 3-(2-Ethoxy-4-diethylaminophenyl)-3-(1-ethyl-2-methylindol-3-yl)phthalide[3] |
| Surfactant | BYK 336[4] |

Available from [1]American Dye Source, Inc., Canada; [2]Sigma-Aldrich, Canada; [3]Yamamoto Chemicals Inc., Japan; and [4]BYK Chimie, USA.

A near infrared laser imaging coating composition for a negative-working thermal lithographic printing offset plate was prepared using the above ingredients. More specifically, the liquid components of the coating solution were 90 wt % n-propanol, 9.8 wt % de-ionized water and 0.2 wt % of BYK 336 surfactant. The obtained coating solution typically contained about 7.0 wt % of total solids distributed according to the table below:

| Ingredients | Weight (parts) |
|---|---|
| Thermolak ® NIP830 | 22.5 |
| Tuxedo ® XAP02 | 5.00 |
| Tuxedo ® 06051D | 5.30 |
| 3-Mercapto triazole | 0.20 |
| Blue 503 | 0.30 |

Preparation of Thermal Lithographic Printing Plates

Thermal lithographic offset printing plates were prepared as follow. First, the above near infrared laser imaging coating solution was coated on an aluminum substrate using a wire-wound rod, then dried at 95° C. in a hot air oven for 2 minutes. The dry weight of the near infrared imaging layer was adjusted to be around 1.0 g/m$^2$.

Then, for each plate, one of the water-soluble overcoat solutions of Examples 6 to 13 was applied on the near infrared laser imaging layer using a wire-wound rod. The coated plates were dried in a hot air oven at 95° C. for 5 minutes. The dry weight of the overcoat layer was around 1.0 g/m$^2$.

Performances of the Printing Plates
White Light Handling Capability and Adhesion The white light handing capability of the different thermal plates prepared above was investigated by placing the printing plates with the different overcoat layers about 1 m below 2 fluorescent lamps (Model F32WT8, available from Philips) for different duration. The plates were then developed using a water solution containing 50 wt % of Developer 956 (Aqueous developer for negative printing plates, available from Kodak, USA). The amount of staining produced by the white light was then evaluated.

The adhesion of the overcoat layer to the plate was tested by applying adhesive tape on the overcoat layer and pulling the tape off. The performances observed were classified as "Poor", "Moderate", "Good" and "Excellent", where "Poor" means that almost all of the area to which the tape was applied was removed by pulling the tape, and "Excellent" means that none or almost none of the area to which the tape was applied was removed by pulling the tape.

The results obtained by these two tests are the following:

| Overcoat Layer | Adhesion | Background |
|---|---|---|
| Example 6 | Excellent | Clean after 8 hours |
| Example 7 | Excellent | Clean after 8 hours |
| Example 8 | Good | Clean after 8 hours |
| Example 9 | Good | Clean after 8 hours |
| Example 10 | Good | Clean after 8 hours |
| Example 11 | Moderate | Clean after 8 hours |

-continued

| Overcoat Layer | Adhesion | Background |
|---|---|---|
| Comparative Example 12 | Excellent | Staining after 3 hours |
| Comparative Example 13 | Poor | Severe staining after 3 hours |

As can be seen from this table, the thermal lithographic offset printing plates of the invention (Examples 6-11) were exposed to white light for more than 8 hours without background staining. In contrast, the printing plates comprising the overcoat layers of Comparative Example 12 and 13 showed (severe) background staining after exposure to fluorescent light for only 3 hours.

As can also be seen from this table, the adhesion of the overcoat layer of Examples 6 to 11 is excellent to moderate. While, the adhesion of the overcoat layer of Example 13, which comprises only polyvinyl alcohol is very poor. In fact, the adhesive tape removes almost the entire areas to which it adhered. Moreover, at the cutting edges of the plates, the overcoat layer peeled off.

Packaging Without Interleaving Papers

One hundred (100) of each of the above thermal lithographic offset printing plates (Examples 6-13) were produced. The plates were stacked without the interleaving paper between them. These 100-plate stacks were each enclosed in a cardboard box and stored at 25° C. for 1 month. The boxes were open and the plates were checked.

The printing plates prepared from Examples 12 and 13 show severe scratching and were slightly stuck together. This is the reason why the use interleaving paper when packaging lithographic plates has been necessary up to now. In contrast, the plates of Examples 6-11 were not scratched and none of them stuck together. This clearly demonstrates that these plates can be packaged without using interleaving paper.

Near Infrared Laser Imaging and Printing Tests

The thermal lithographic offset printing plates Examples 6-11 were imaged at 150 mJ/cm² using a plate setter (PlateRite 4300S, available from Screen USA) and mounted on an AB Dick press. All of the plates showed good printing images on papers after 25 revolutions.

Effect of Humidity

The effect of humidity on each of the thermal lithographic offset printing plates of Examples 6-13 was studied by placing the coated plates in an oven at 40° C. and 80% relative humidity. The plates were then developed with a water solution containing 50 wt % of Developer 956. The results obtained by this test are the following:

| Overcoat Layer | Background |
|---|---|
| Example 6 | Clean after 5 days |
| Example 7 | Clean after 5 days |
| Example 8 | Clean after 5 days |
| Example 9 | Clean after 5 days |
| Example 10 | Clean after 5 days |
| Example 11 | Clean after 5 days |
| Example 12 | Clean after 5 days |
| Example 13 | Clean after 5 days |
| No overcoat layer | Staining after 3 days |

Without the overcoat layer, the plates showed severe background staining after only 3 days in the oven. The thermal lithographic offset printing plates of Examples 6-13 provided a clean background after 5 days in the oven at 40° C. and 80% relative humidity. This clearly demonstrates that the overcoat layer of the invention (Examples 6-11) protect the imaging layer for $O_2$ and $H_2O$ as well as the overcoat layers of the prior art.

Although the present invention has been described hereinabove by way of specific embodiments thereof, it can be modified, without departing from the spirit and nature of the subject invention as defined in the appended claims.

The invention claimed is:

1. A thermal lithographic printing plate overcoat composition comprising:
    (a) a water-soluble polymeric dye having an absorption peak within a range between about 300 and about 600 nm; and
    (b) micro-particles or nano-particles,
    wherein the overcoat composition is transparent to near infrared radiation and
    wherein said polymeric dye is of formula:

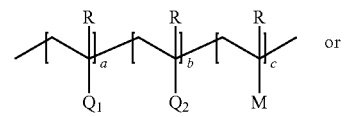

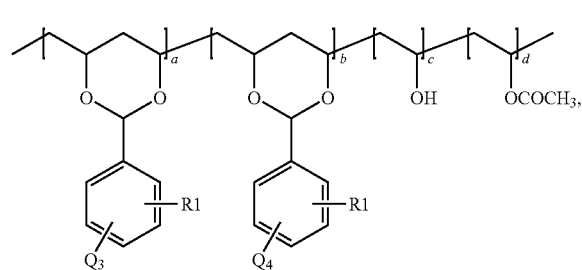

wherein a and c independently vary between about 0.05 and about 0.95; b varies between about 0.00 and about 0.50; d varies between about 0.02 and about 0.20, R represents hydrogen or methyl; R1 represents hydrogen, hydroxy, alkoxy, alkyl, halide, or carboxylic acid; M represents carboxylic acid, 1-imidazole, 2-pyrrolidone, a polyethylene oxide chain, sulfonic acid or phosphoric acid; and $Q_1$, $Q_2$, $Q_3$ and $Q_4$ are the same or different and represent a chromophore having said absorption peak.

2. The overcoat composition of claim 1 wherein said absorption peak is within a range between about 300 and about 480 nm.

3. The overcoat composition of claim 1 wherein one of $Q_1$, $Q_2$, $Q_3$ and $Q_4$ is

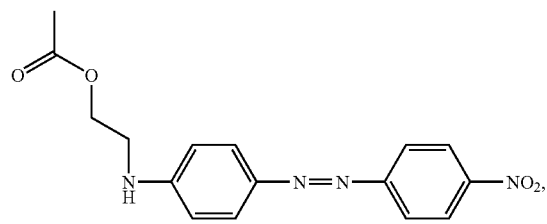
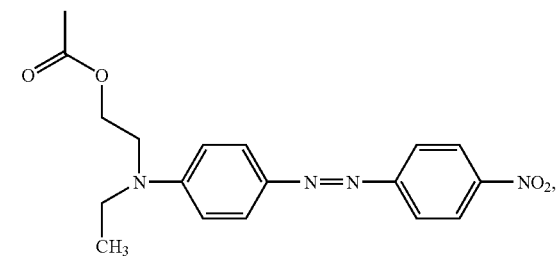
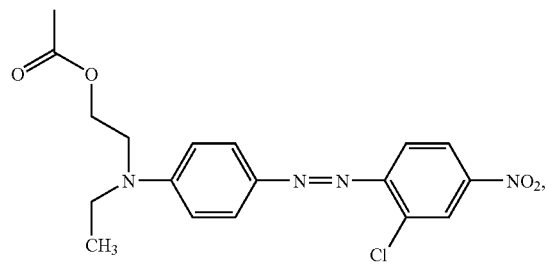
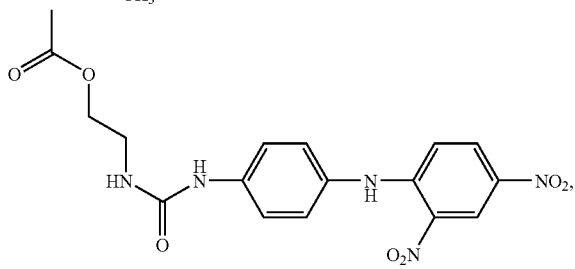
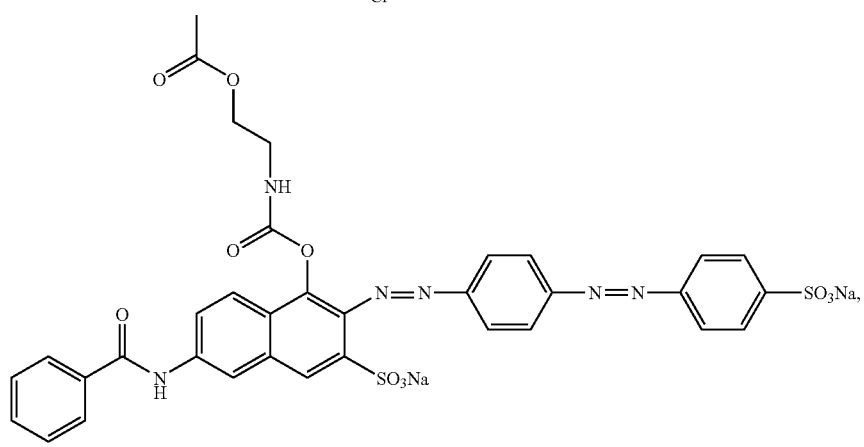
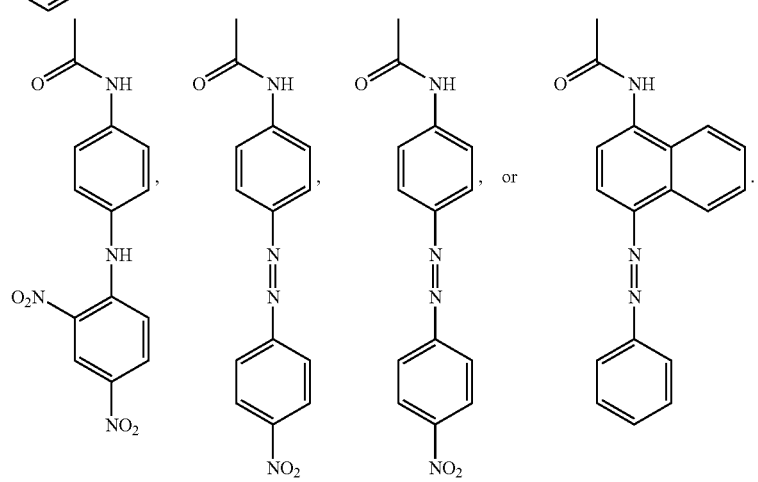

4. The overcoat composition of claim 1 comprising inorganic nano-particles.

5. The overcoat composition of claim 4 wherein said inorganic nano-particles comprise silicon oxide, aluminium oxide, zirconium oxide or zinc oxide.

6. The overcoat composition of claim 4 wherein said inorganic nano-particles have a particle size of less than about 80 nm.

7. The overcoat composition of claim 1 comprising organic micro-particles.

8. The overcoat composition of claim 7 wherein said organic micro-particles comprise copolymers of (A) acrylate or methylmethacrylate with (B) styrene, 2-hydroxy ethylmethacrylate, methacrylate, poly(ethylene oxide) methacrylate or a linear or branched alkyl methacrylate, said copolymers being crosslinked.

9. The overcoat composition of claim 7 wherein said organic micro-particles have a particle size of between about 2 and about 8 μm.

10. The overcoat composition of claim 1 suitable for use as an overcoat layer disposed on a near infrared imaging layer supported by a hydrophilic substrate in a negative-working thermal lithographic printing plate.

11. The overcoat composition of claim 10 wherein said absorption peak is within a range between about 300 and about 480 nm.

12. The overcoat composition of claim 10 wherein one of $Q_1$, $Q_2$, $Q_3$ and $Q_4$ is 13. The overcoat composition of claim 10 wherein said overcoat layer comprises inorganic nano-particles.

14. The overcoat composition of claim 13 wherein said inorganic nano-particles comprise silicon oxide, aluminium oxide, zirconium oxide or zinc oxide.

15. The overcoat composition of claim 13 wherein said inorganic nano-particles have a particle size of less than about 80 nm.

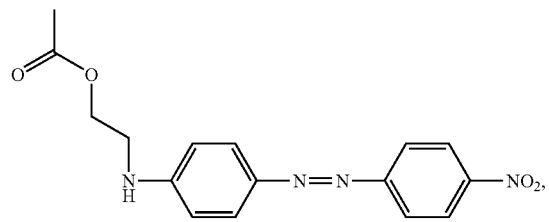

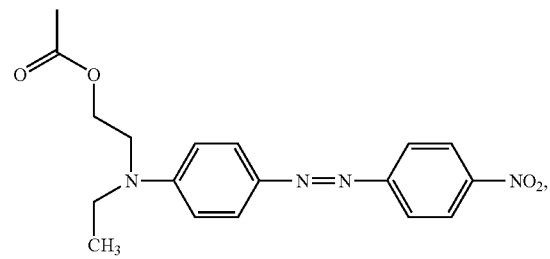

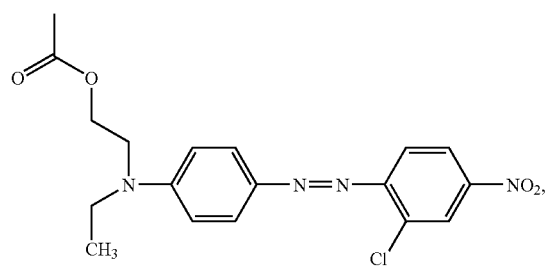

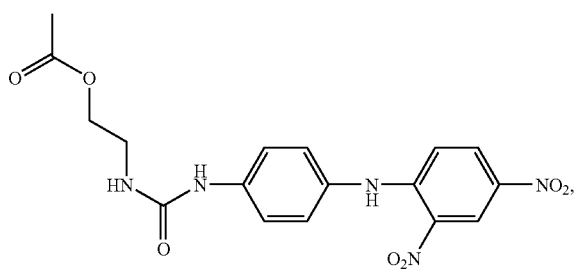

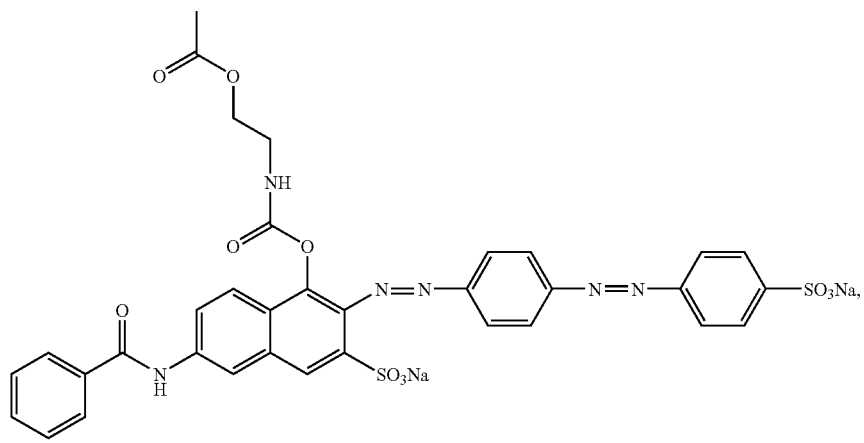

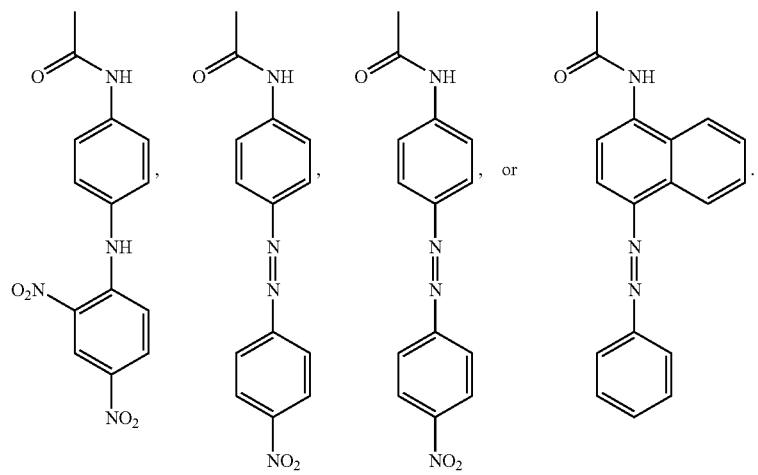

16. The overcoat composition of claim 10 wherein said overcoat layer comprises organic micro-particles.

17. The overcoat composition of claim 16 wherein said organic micro-particles comprise copolymers of (A) acrylate or methylmethacrylate with (B) styrene, 2-hydroxy ethylmethacrylate, methacrylate, poly(ethylene oxide) methacrylate or a linear or branched alkyl methacrylate, said copolymers being crosslinked.

18. The overcoat composition of claim 16 wherein said organic micro-particles have a particle size of between about 2 and about 8 μm.

* * * * *

UNITED STATES PATENT AND TRADEMARK OFFICE
CERTIFICATE OF CORRECTION

PATENT NO. : 8,491,993 B2  Page 1 of 1
APPLICATION NO. : 12/669805
DATED : July 23, 2013
INVENTOR(S) : Nguyen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this
Eighth Day of September, 2015

Michelle K. Lee
*Director of the United States Patent and Trademark Office*